(12) United States Patent
Lomax, Jr. et al.

(10) Patent No.: US 7,117,934 B2
(45) Date of Patent: Oct. 10, 2006

(54) METHOD AND APPARATUS FOR MINIMIZING ADVERSE EFFECTS OF THERMAL EXPANSION IN A HEAT EXCHANGE REACTOR

(75) Inventors: Franklin D. Lomax, Jr., Arlington, VA (US); Michael Sean Streeks, Alexandria, VA (US); Stephen Waide, Arlington, VA (US)

(73) Assignee: H2Gen Innovations, Inc., Alexandria, VA (US)

( * ) Notice: Subject to any disclaimer, the term of this patent is extended or adjusted under 35 U.S.C. 154(b) by 390 days.

(21) Appl. No.: 10/097,745

(22) Filed: Mar. 15, 2002

(65) Prior Publication Data
US 2003/0173062 A1 Sep. 18, 2003

(51) Int. Cl.
*F28F 9/22* (2006.01)
*F28D 21/00* (2006.01)

(52) U.S. Cl. ............... 165/161; 165/158; 165/162; 165/178; 165/82

(58) Field of Classification Search ........... 165/159, 165/160, 161, 146, 81, 82, 140, 158, 162, 165/173, 177, 179, 181, 182; 422/201, 205
See application file for complete search history.

(56) References Cited

U.S. PATENT DOCUMENTS

| | | | | |
|---|---|---|---|---|
| 2,307,355 A | * | 1/1943 | Bredeson | ............... 29/890.46 |
| 3,578,165 A | | 5/1971 | Boose | |
| 4,256,783 A | * | 3/1981 | Takada et al. | ............... 422/197 |
| 4,323,115 A | * | 4/1982 | Stafford et al. | ............... 165/79 |
| 4,643,249 A | * | 2/1987 | Grawey | ............... 165/159 |
| 4,712,387 A | * | 12/1987 | James et al. | ............... 62/434 |
| 4,834,173 A | | 5/1989 | Weiss et al. | |
| 5,941,302 A | * | 8/1999 | Hattori et al. | ............... 165/151 |
| 6,334,482 B1 | * | 1/2002 | Berglund et al. | ............... 165/82 |
| 2001/0018962 A1 | * | 9/2001 | Joshi et al. | ............... 165/11.1 |

FOREIGN PATENT DOCUMENTS

| | | |
|---|---|---|
| JP | 56-113992 | 9/1981 |
| JP | 56113992 A * | 9/1981 |
| JP | 10082590 A * | 3/1998 |

OTHER PUBLICATIONS

U.S. Appl. No. 09/928,437, filed Aug. 14, 2001, Lomax et al.
U.S. Appl. No. 10/097,745, filed Mar. 15, 2002, Lomax et al.
Written Opinion.

* cited by examiner

*Primary Examiner*—Tho Duong

(57) ABSTRACT

A heat exchange reactor including a housing, a plurality of tubes mounted in the housing and configured to carry a first fluid, and a baffle having a plurality of holes receiving the tubes. The baffle is configured to guide a second fluid provided within the housing to flow in a direction generally perpendicular to the tubes. The reactor includes various configurations for minimizing adverse effects of thermal expansion of the baffle and the tubes. The reactor is configured to minimize mechanical interference between the baffle and the tubes in both an operational state and a non-operational state, for example, by shaping the holes in the baffle to take into account thermal expansion. The reactor also includes a thermal insulator along a length of the tubes at a large temperature gradient zone within the reactor. The reactor further includes a heat transfer fin in contact with only one of the tubes.

49 Claims, 6 Drawing Sheets

METHOD AND APPARATUS FOR MINIMIZING ADVERSE EFFECTS OF THERMAL EXPANSION IN A HEAT EXCHANGE REACTOR

BACKGROUND OF THE INVENTION

1. Field of the Invention

The present invention relates to heat exchange reactors and methods of constructing heat exchange reactors.

2. Discussion of the Background

Heat exchange reactors are often employed to carry out chemical reactions where significant quantities of heat must be added or removed from a first reacting fluid to a second heat transfer fluid, which may or may not be reacting. These heat exchange reactors often bear a strong resemblance to simple heat exchangers, but are often provided with additional features such as fixed beds of catalysts, specialized flowpath designs, exotic materials and the like. Heat exchange reactors are constructed in many forms, including plate-fin and tubular arrays.

An example of a reaction conducted in heat exchange reactors is the steam reformation of hydrocarbon feedstocks to produce hydrogen-containing gas mixtures. In this process, a mixture of steam and hydrocarbon is passed through one fluid circuit while a hot fluid, usually combustion product, flows through a separate fluid circuit and transfers heat into the reacting first fluid to promote the highly endothermic steam reforming reaction. An example of a plate-fin type hydrocarbon steam reformer is shown in U.S. Pat. No. 5,733,347 to Lesieur. Several examples of tubular heat exchange reformers have been revealed, for example U.S. Pat. No. 3,446,594 to Buswell et al. An advanced tubular reformer configuration which offers significant advantages over other configurations is disclosed in U.S. application Ser. Nos. 09/642,008 and 09/928,437 to Lomax et al., which are incorporated herein by reference in their entirety.

The present inventors have determined that many heat exchange reactors face a serious mechanical design challenge due to the temperature differences between the reacting first fluid and the second heat transfer fluid. These temperature differences set up thermal strains, or displacements, due to differential expansion of the material of construction of the heat exchange reactor. If free expansion is not allowed for in the configuration of the heat exchange reactor, then the unrealized strains result in thermal stresses. The thermal stresses are particularly challenging in hydrocarbon steam reformers because the temperature gradients are generally very high. Further, modern heat exchange reactors for steam reforming strive to reduce the physical size of the reactor to reduce cost and facilitate their employment in space and weight sensitive applications such as vehicles. The reduction in physical size results in an aggravation of the problem of thermal stresses by drastically-increasing the thermal gradients in the heat exchange reactor.

In tubular heat exchange reactors in general, and in the improved reactor of U.S. application Ser. No. 09/642,008 in particular, one route to achieving a more compact reactor is the provision of baffle features to induce flow of the second fluid in a direction substantially normal or perpendicular to the axis of the tubes. Such a flow arrangement is termed cross flow. By placing several baffle features along the length of the heat exchange reactor tubes, the second heat exchange fluid may be induced to flow across the tube array several times. Through optimal selection of the number and spacing of baffles, the mechanical configuration of a tubular heat exchange reactor may be optimized for factors such as physical size, second fluid pressure drop, and other important features.

The provision of features in tubular array heat exchange reactors presents formidable challenges due to the thermal gradients along the axis of the tubes. These challenges are due to the fact that thermal expansion at a given temperature is related to three factors including temperature, material of construction, and physical dimension. The thermal expansion is expressed by the relationship $\Delta L = \alpha \Delta T L_o$, where $\alpha$ is nominally a constant determined by the material of construction (i.e., a coefficient of thermal expansion), $\Delta T$ is the variation between the temperature of interest and a reference temperature, and $L_o$ is the initial length of the feature at the reference temperature. Because the baffles are generally planar parts of large extent normal to the tubes, the expansion of the baffles with temperature change is very large compared to the expansion of the tubes themselves, which are generally much smaller in a plane normal to the axis of the tubes.

In the advanced heat exchange steam reforming reactor of the type disclosed in U.S. application Ser. No. 09/642,008, the inventors have determined that the problems associated with thermal expansion are compounded because the array of tubes is colder at both ends than in the center. Since the tubes are joined to header plates of rigid pressure heads at both ends of the tubes, the relative expansion of the tubes in the plane normal to the longitudinal axis of the tubes is fixed by the temperature of the pressure heads. In the zone of higher temperature located in the center between the ends of the tubes, the planar parts normal to the tubes (e.g., baffles and planar fins) expand at a proportionally greater amount than the colder pressure heads. The inventors have determined that if the entire reactor is constructed of materials with similar coefficients of thermal expansion ($\alpha$), then the planar features are apt to exert severe forces normal to the axis of the tubes. These forces can cause premature structural failure of the reactor unless exceptionally strong tubes are employed, which is undesirable for several reasons, including an objectionable increase in the material usage in the construction of the reactor, as well as an attendant increase in volume and weight of the reactor.

SUMMARY OF THE INVENTION

In an effort to eliminate these problems, the inventors have constructed a heat exchange reactor that is configured to minimize the adverse effects of thermal expansion as described below.

Accordingly, the present invention provides methods and configuration to reduce thermal stresses within the heat exchange reactor, provide enhanced corrosion resistance to the tubes of the heat exchange reactor, increase the strength of the tubes of the heat exchange reactor, and reduce the total tube material usage compared to other configurations.

The present invention advantageously provides a heat exchange reactor including a housing, a plurality of tubes mounted in the housing and configured to carry a first fluid, and a baffle having a plurality of holes receiving the tubes. The baffle is configured to guide a second fluid provided within the housing to flow in a direction generally perpendicular to the tubes. The heat exchange reactor further advantageously includes various means for minimizing adverse effects of thermal expansion of at least one of the baffle and the plurality of tubes.

In an embodiment of the present invention, the heat exchange reactor further includes a first header plate mounting first ends of the tubes within the housing and a second header plate mounting second ends of the tubes within the housing. In this embodiment, the means for minimizing adverse effects of thermal expansion includes means for reducing a differential thermal expansion between the first header plate, the second header plate, and the baffle. For example, the differential thermal expansion can be reduced by selecting materials for these elements that provide similar thermal expansion depending upon a specific temperature zone in which the element is mounted within the housing.

In another embodiment of the present invention, the heat exchange reactor is configured such that the means for minimizing adverse effects of thermal expansion includes means for minimizing mechanical interference between the baffle and the plurality of tubes in both an operational state of the heat exchange reactor and a non-operational state of the heat exchange reactor. For example, at least one hole of the plurality of holes can be shaped to minimize mechanical interference between a respective tube extending through the at least one hole to minimize mechanical interference between the baffle and the respective tube in both the operational state of the heat exchange reactor and the non-operational state of the heat exchange reactor when the various elements have thermally expanded.

In a further embodiment of the present invention, the heat exchange reactor is configured such that the means for minimizing the adverse effects of thermal expansion includes means for providing a thermal insulation zone along a length of the tubes at a large temperature gradient zone within the heat exchange reactor.

In a further embodiment of the present invention, the heat exchange reactor further includes a heat transfer fin in contact with at least one of the tubes, such that the heat transfer fin is configured to contact the second fluid provided within the housing. The heat exchange reactor includes means for minimizing adverse effects of thermal expansion of the heat transfer fin. For example, the heat transfer fin can be in contact with one tube of the plurality of tubes, such that the heat transfer fin is not attached to another tube of the plurality of tubes.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
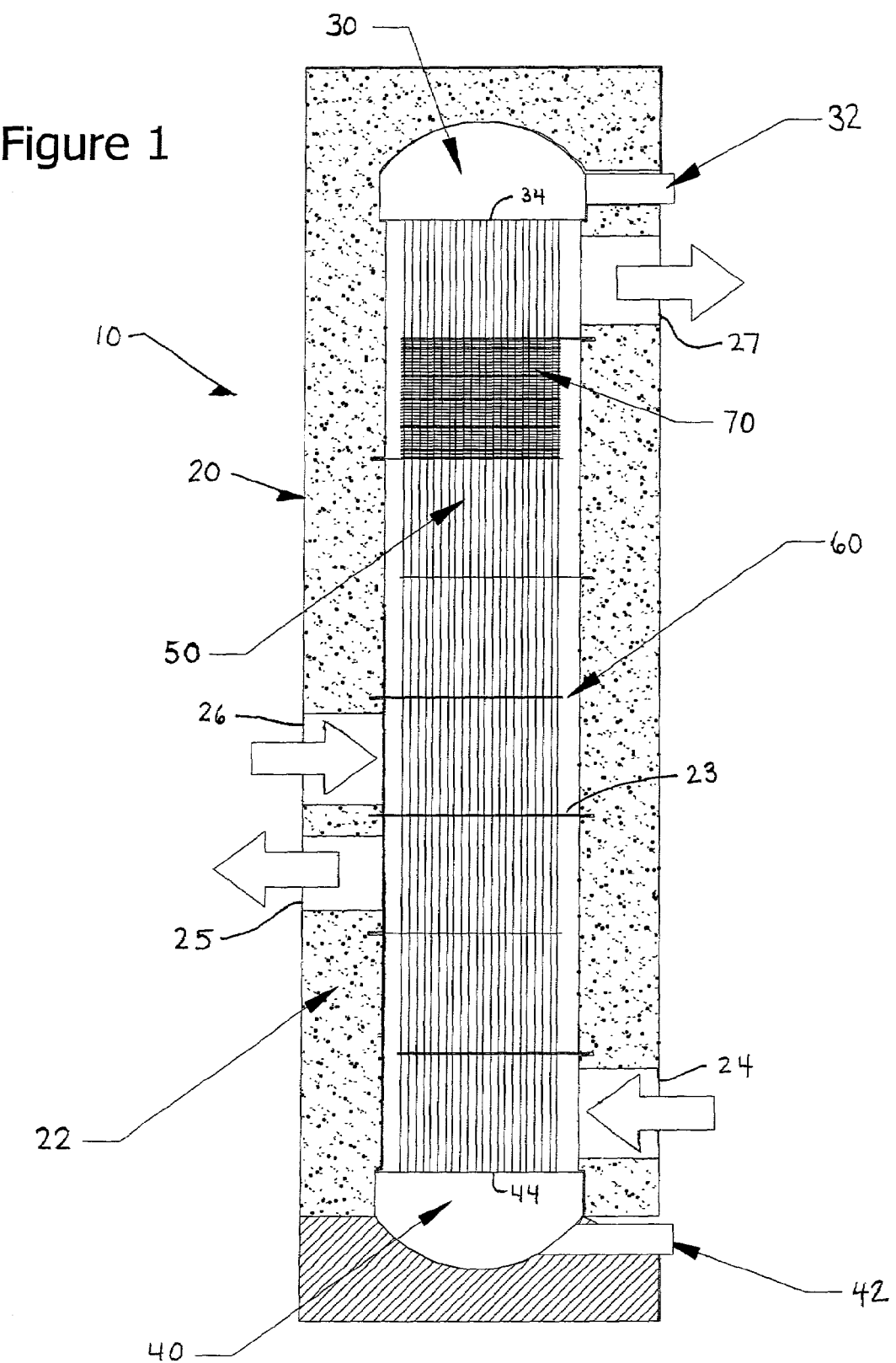
FIG. 1 depicts a schematic side view of a tubular heat exchange reactor of the related art with thermal gradients between tube headers and a zone located along an axis of the tubes between the tube headers.

FIG. 1 depicts the core of a tubular heat exchange reactor 10. The reactor 10 includes a housing 20 that encloses a plurality of tubes 50 that are mechanically connected at one end to a header plate 34 of a first manifold assembly 30 and at an opposing end to a header plate 44 of a second manifold assembly 40. The first manifold assembly 30 is provided with a first fluid inlet port 32 and the second manifold assembly is provided with an exit port 42. The first fluid flows through inlet 32 to the first manifold assembly 30, the first manifold assembly 30 distributes through the first fluid to the plurality of tubes 50 to the second manifold assembly 40, and the first fluid then flows through exit 42. The first fluid flowing through the tubes 50 is in heat exchange contact with at least one second fluid that is provided within the housing 20 and is in contact with an outer surface 51 (labeled in FIG. 5) of the tubes 50.

The heat exchange reactor 10 includes baffles 60 loosely mounted within slots in the walls 22 of the housing 20 that guide the flow of one or more additional fluids within the housing 20 to flow in a direction substantially perpendicular to a longitudinal axis of the tubes. In FIG. 1, a second fluid at a first temperature flows into inlet 24, extracts heat from the first fluid through the walls of the tubes 50 as the second fluid flows in a serpentine fashion guided by the baffles 60, the heat exchange reactor walls 22 and the divider wall 23, and exits the core at a second, higher temperature at exit 25. Either the second fluid is heated or a third fluid is introduced at a third, yet-higher temperature at inlet 26, and the fluid then flows across the tubes 50 in several consecutive cross-flow passes as guided by the baffles 60. The fluid entering through inlet 26 transfers heat through the walls of the tubes 50 to the first fluid, and exits the housing 20 at a fourth, lower temperature at exit 27. Heat exchange between the first and second (or third) fluid streams may be enhanced by the use of extended heat transfer surfaces 70. In FIG. 1, the extended surfaces are of the plate-fin type, which include a planar heat exchange surface that is attached to a plurality of the tubes 50 by mechanical expansion, brazing, soldering, or other methods readily apparent to one of ordinary skill in the art.

In the core of the heat exchange reactor 10 of FIG. 1, the average metal temperature of the core is highest at the high temperature inlet 26, and is lower at the flow manifold assemblies 30 and 40. FIG. 1 shows an overall flow geometry identical to that described in U.S. application Ser. No. 09/642,008, however other flow geometries which cause the thermal gradients addressed in the present invention may be conceived. For instance, the central zone of the reactor may be at a lower temperature than the two ends. FIG. 1 also shows reactor walls 22 similar to those described in U.S. application Ser. No. 09/928,437, however other reactor wall types can alternatively be used, such as a shell-type wall, and the present invention is also advantageously applied to such configurations.

Figure 2:
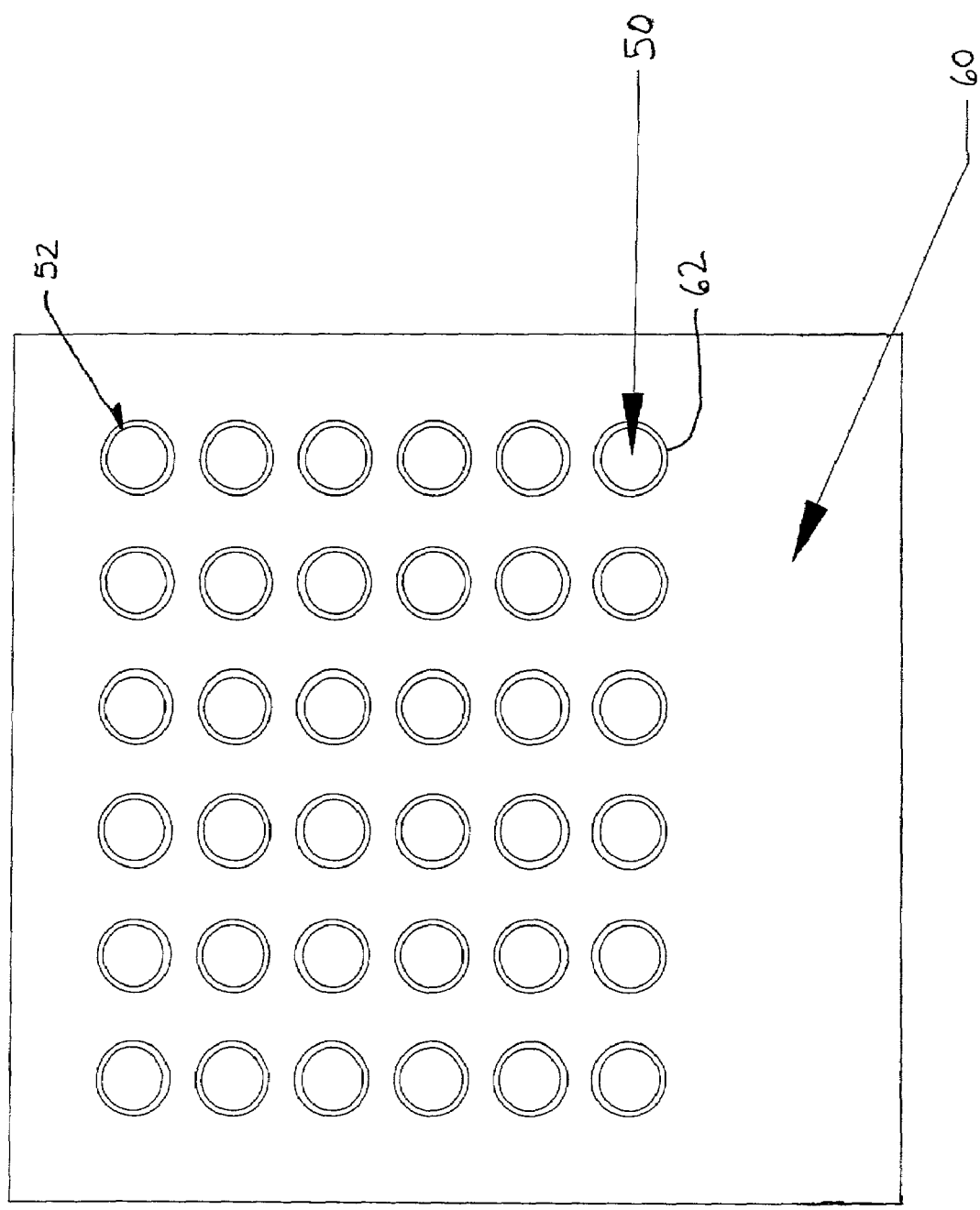
FIG. 2 depicts a plan view of a tubular reactor array and baffle of the reactor depicted in FIG. 1.

FIG. 2 shows a plan view of the tubes 50 and a baffle 60 of FIG. 1 in a non-operational, ambient state as assembled. An array 52 of tubes 50 are placed through holes 62 in the baffle 60. The baffle 60 depicted in FIG. 2 is planar and is typical of those located along the length of the reactor core in FIG. 1. It should be noted that the holes 62 accommodating the tubes 50 are slightly larger in diameter than the outer diameter of the tube 50, however the clearance between the holes 62 and the tubes 50 is small in order to prevent fluid from bypassing the baffle 60 and traveling through the holes 62. The extended heat exchange surfaces 70 are similar in plan view to the baffle 60, however the heat exchange surfaces 70 are intimately connected to the tubes 50 to provide efficient thermal conduction, thus the annular space between the tube wall and baffle plate hole shown in FIG. 2 does not exist for the plate-fin extended heat transfer surface.

Figure 3:
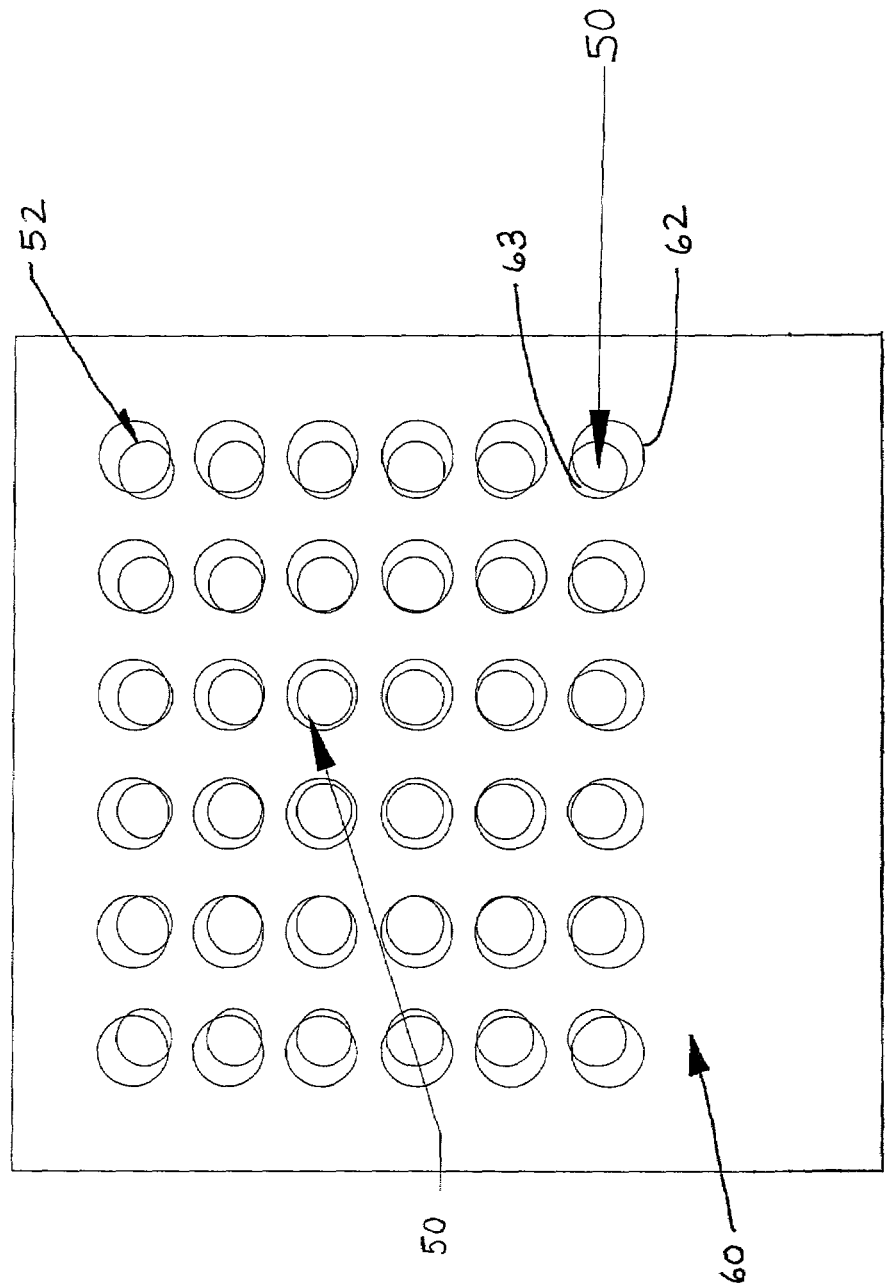
FIG. 3 illustrates a mechanical interference problem between the baffle and the tubes of FIG. 1 caused by thermal expansion of the baffle.

FIG. 3 shows a plan view of a baffle 60 in the high-temperature zone of the reactor core of FIG. 1 in a heated operational state. The baffle plate 60 is expanded due to the increase in temperature as compared to the non-operational state depicted in FIG. 2. The thermal expansion can cause mechanical interference 63 between the tubes 50 and the holes 62 in tubes 50 that are located away from a center axis 54 of the array 52 of tubes 50. It can be seen that the closer a hole 62 is to the center 54 of the array 52, then the proportionally less the relative motion and mechanical interference 63 is between the tube 50 and baffle-plate hole 62. In reality, the relative motion shown in FIG. 3 results in mechanical contact between the baffle plate 60 and the tubes 50, which generates significant stresses in both components. Depending upon material selection, the resulting stresses can cause permanent deformation of the tube 50, the baffle plate 60, or both. Furthermore, the local stresses can significantly shorten the useful operating lifetime of the heat exchange reactor 10. For the case of a plate-fin extended heat exchange surface 70, as depicted in FIG. 1, which is initially in contact with every tube 50, the effects of the differential thermal expansion are even more marked due to the direct joining of the plate-fins 70 to the tubes 50, such that the differential expansion effects yield stresses even at relatively minor temperature gradients.

The present invention advantageously provides a method to reduce the magnitude of the relative or differential thermal expansion of the baffles 60 and/or the fins 70 relative to the header plates 34 and 44 when the temperature of the baffles 60 and the fins 70 is higher than that of the manifold assemblies 30 and 40. The method involves choosing a material used to construct the baffles 60 and/or the fins 70 with a lower coefficient of thermal expansion ($\alpha$) than the coefficient of thermal expansion of the material used to build the header plates 34 and 44. Likewise, in the case where the baffles 60 and fins 70 are at a lower temperature than the manifold assemblies 30 and 40, then the baffles 60 and fins 70 are constructed using a material having a higher coefficient of thermal expansion than the coefficient of thermal expansion of the material used to build the header plates 34 and 44. The construction of a complex assembly for high temperature service using materials of differing coefficients of thermal expansion is directly counter to the teachings of the related art, and is particularly advantageous to the construction of tubular heat exchange reactors of the type described in U.S. application Ser. No. 09/642,008. This first method of constructing the heat exchange reactor 10 reduces the magnitude of the relative or differential motion between the baffles 60, the fins 70, and the header plates 34 and 44, but does not eliminate it. Thus, this method is desirably combined with other methods described below to further reduce the adverse effects of differential thermal expansion.

Figure 4:
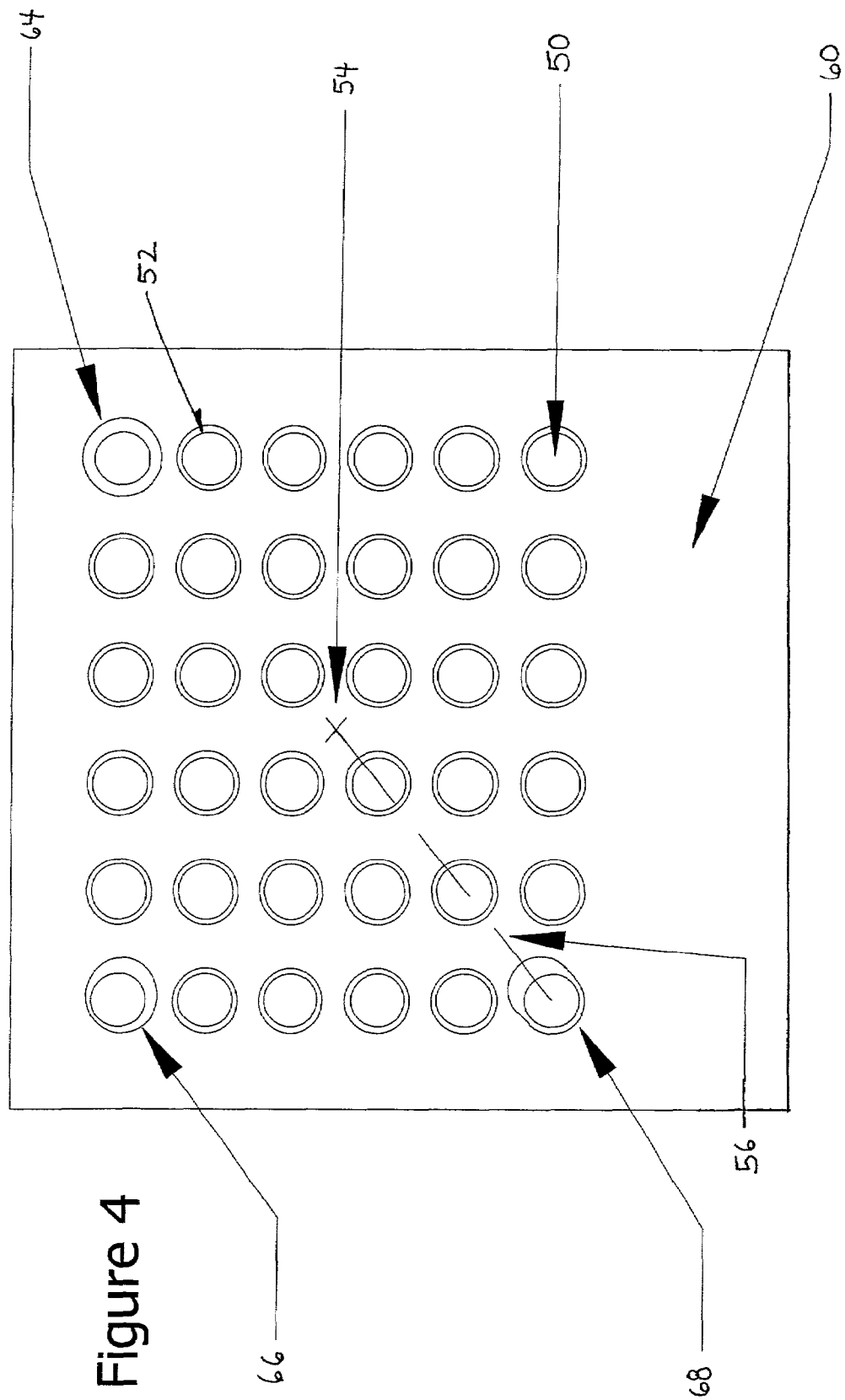
FIG. 4 depicts various baffle hole configurations according to the present invention that alleviate mechanical interference between the baffle and the tubes.

Additional preferred methods for eliminating the problem of differential thermal expansion for manifolding baffles are illustrated in FIG. 4. FIG. 4 is a plan view of a baffle 60 including three different configurations of means to minimize the adverse effects of differential thermal expansion between the baffle 60 and the header plates 34 and 44 of the rigid manifolds 30 and 40. FIG. 4 is drawn for the case of a tubular heat exchange reactor employing the flow geometry of U.S. application Ser. No. 09/642,008 with the baffle 60 being located in a higher temperature zone and the manifold assemblies 30 and 40 being located in lower temperature zones, and is drawn in a non-operational, ambient state (i.e. no differential expansion).

All of the configurations presented in FIG. 4 are capable of completely eliminating the mechanical interference between the baffle 60 and the tubes 50 when used singly without other methods of the present invention. When the configurations depicted in FIG. 4 are used in combination with the method of selecting a material having an appropriate thermal coefficient of expansion to reduce differential thermal expansion, the additional benefit of reduced flow bypass through the baffle holes 62 is achieved due to a reduction in the overall size of the holes 62 necessary to prevent mechanical interference.

The first configuration used to eliminate mechanical interference is the provision of a larger diameter hole 64 through the baffle 60, which is concentric with the tube 50 extending through the hole 64. The diameter of the larger diameter hole 64 is selected to prevent mechanical interference between the hole 64 and the tube 50 extending therethrough in both an operational state and a non-operational state. The diameter is chosen either experimentally or theoretically based upon the temperature gradient between the baffle 60 and the header plates 34 and 44 of the manifolds 30 and 40, the distance between the tube 50 in question and the center 54 of the tubular array 52, and the coefficient of thermal expansion of the material used to construct the baffle 60 and the header plates 34 and 44 of the manifold assemblies 30 and 40. Thus, larger diameter holes may be provided for those tubes furthest from the tube array centerline, and smaller holes may be chosen near the tube array centerline. Note that FIG. 4 only shows one larger diameter hole 64, however, the remaining holes 62 of the baffle 60 can also be enlarged in the above manner in order to prevent mechanical interference. The choice of the smallest diameter hole which completely avoids mechanical interference upon temperature cycling for any given tube is preferred to best control flow bypassing of the baffle, which reduces the heat transfer performance of the heat exchange reactor.

In the embodiment described above, the size of the holes in the baffle plates are determined based upon the location of the holes with respect to the center of the array of tubes. However, for components such as baffle 60 that have a geometrical center that is not coincident with the center of the tube array, the method of the present invention is slightly modified to account for the difference in baffle expansion relative to the geometric center of the baffle and header expansion relative to the geometric center of the header plates. The offset between the center of the header plates, the center of the baffle plate in question, and the center of the array of tubes can be accounted for in calculating the relative movement of the components during expansion in order to determine the size of the holes in the baffle plate needed to prevent interference between the tubes and the baffle plate holes during both operational and non-operational states. In this configuration, the baffle plate holes can be formed relative to a center of relative expansion between the header plates and the baffle plate. In practice, the difference is generally small, but becomes more important for large tubular arrays or arrays formed using tubes of large diameter.

A more preferred means of eliminating mechanical interference on temperature cycling is to provide a circular hole 66 having a center that is offset towards the center 64 of the tube array 52. For the same amount of relative thermal expansion, the more preferred hole 66 can be constructed to be smaller than the hole 64, thereby reducing the objectionable flow bypassing the baffle 60 through the hole 66 as compared to hole 64. The flow bypassing may be further reduced by using smaller holes for tubes 50 located closer to the centerline 54 of the tube array 52. Note that FIG. 4 only shows one offset hole 66, however, the remaining holes 62 of the baffle 60 can also be configured in the above manner in order to prevent mechanical interference.

The undesirable flow bypassing may be further reduced by providing a non-circular hole 68, which is elongated along the axis of expansion or radial line 56 extending between the center of the tube 50 in question and the center 54 of the tube array 52. The axis of expansion may be shifted to a center of relative expansion in the manner discussed above if there is a difference between the baffle center and/or header plate center and the center of the tubular array. Again, the effect of the shift is generally small unless large arrays are employed, or if the offsets are appreciable. The total area of the non-circular hole 68 may advantageously be less than the non-concentric, circular hole 66, which itself is less than the area of the concentric, circular hole 64. Depending upon the method of manufacture of the baffle, the provision of the non-circular hole may undesirably increase manufacturing expense relative to the methods employing circular holes. Thus, the most-preferred method depends upon the relative importance of baffle manufacturing cost and heat transfer performance, the first being optimized by employing the method of non-concentric, circular holes, the second being optimized by the use of the method of non-circular holes. Note that FIG. 4 only shows one elongated hole 68, however, the remaining holes 62 of the baffle 60 can also be configured in the above manner in order to prevent mechanical interference.

Note that the shape, size, and location of the tubes 50 and the holes 62 in the baffle 60 can be modified if desired.

The methods described above for eliminating mechanical interference due to thermal expansion are applicable to flow-manifolding baffles 60 and other components which do not require direct mechanical contact between the component and the individual tubes 50 in the array 52. The fins 70 described above which act as extended heat transfer surfaces in the heat exchange reformer require intimate mechanical contact with every tube in order to provide thermal conduction. The configurations depicted in FIG. 4 are not appropriate for use with the extended heat transfer surfaces 70 to reduce thermal stresses.

The present invention provides improved extended heat transfer surfaces 80 for application in tubular heat exchange reactors 10 with temperature gradients along the axis of the tubes 50. Several embodiments of the heat transfer surfaces 80 of the present invention are illustrated in FIG. 5, which shows a cross-section of two tubes 50 with three different configurations (84, 86, and 88) of attached extended heat transfer surfaces 80 according to the present invention.

Figure 5:
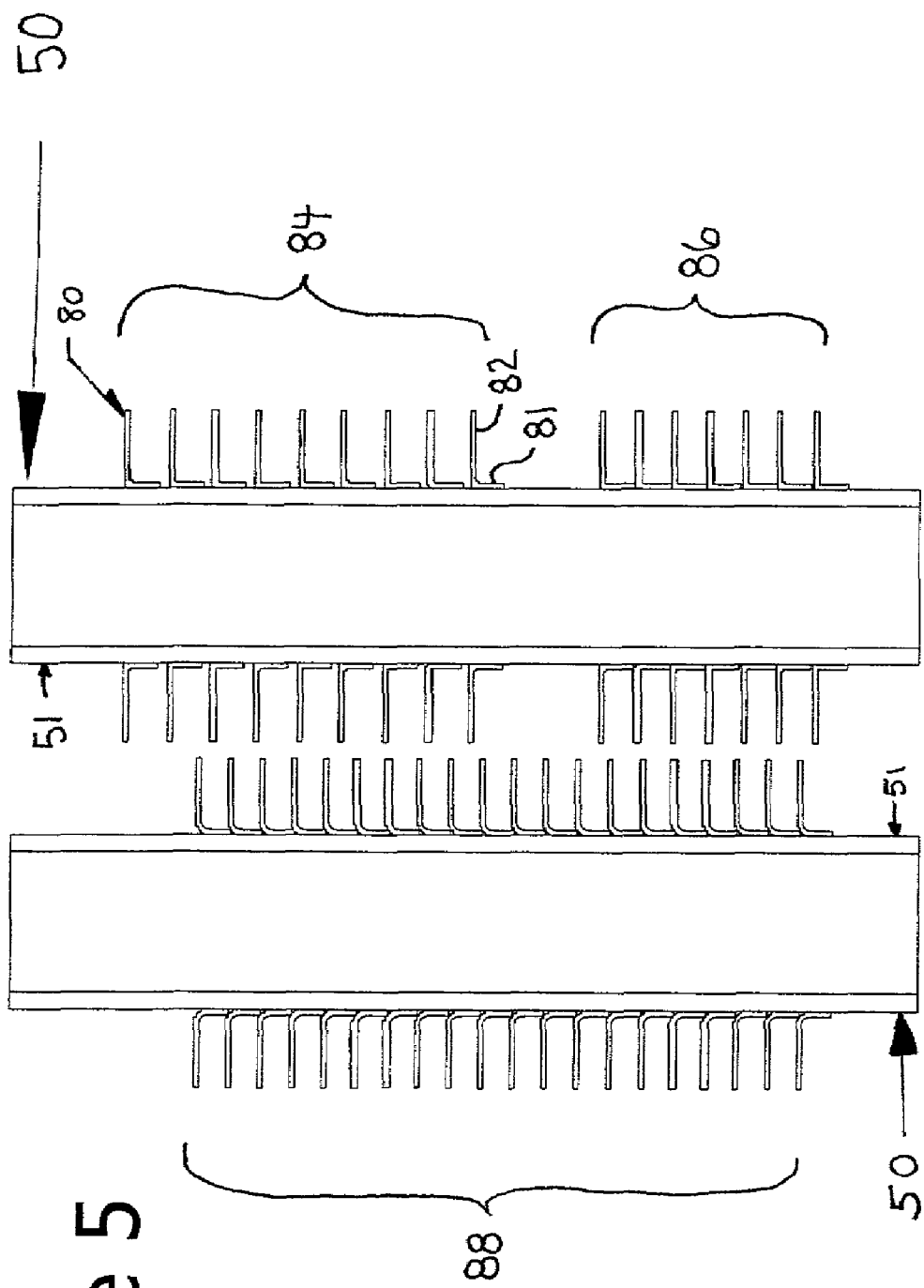
FIG. 5 is a section view of two tubes with various embodiments of heat transfer fins according to the present invention.

Referring to FIG. 5, the tubes 50 are provided with a plurality of extended heat transfer elements 80, which are connected to a single tube, and therefore are not connected to another tube in the array. Because each tube has extended heat transfer surfaces 80 that are independent of those of the other tubes, the relative motion of the tubes due to thermal expansion does not put stress upon the fins 80. In planar form, the individual extended heat transfer elements or fins 80, may be circular, ovoid, polygonal, or any other shape. In the attached configuration as depicted in FIG. 5, the fins 80 have a collar portion 81 generally parallel to and in contact with an outer surface 51 of the tube 50, and a fin portion 82 connected to the collar portion 81 and extending in direction opposite to an axis of the tube 50. The fins 80 can be configured, as illustrated in FIG. 5, to not overlap the fins of adjacent tubes, or alternatively the fins 80 can be of such a size that they do overlap the fins of adjacent tubes.

The extended heat transfer surfaces 80 may be formed by a variety of methods such as hydroforming, laser cutting, machining, and stamping. Stamping is the preferred method of fabrication, as this method affords the greatest rapidity of manufacture while minimizing scrap production. The heat transfer surfaces 80 may be attached to the outer surface 51 of the tubes 50 by soldering, brazing, adhesive bonding, welding or mechanical expansion. For application is steam reformers, mechanical expansion is the preferred method of attachment.

In a first configuration of fins depicted in FIG. 5, the fins 84 are spaced along the axis of the tube so that sections of the outer surface 51 of the underlying tube 50 are exposed to the heat transfer fluid flowing outside the tubes. This configuration has the advantage of utilizing fewer heat transfer fins per length of tube, and may offer lower pressure drop than the other configurations. As stated above, because each tube has extended heat transfer surfaces 80 that are independent of those of the other tubes, the relative motion of the tubes due to thermal expansion does not put stress upon the fins 80, which also does not put stress upon the tubes 50. This allows a tube of any given thickness to operate at a lower total state of stress. For high temperature applications such as steam reformers with a given tube wall thickness, the heat exchange reactor 10 will attain a longer useful operating life when operated at a lower total stress. Alternatively, the tube wall thickness may be reduced in order to reduce the cost of the tubing, while improving the heat transfer performance of the heat exchange reactor.

The tube wall thickness selection is dictated by three factors when a given material is considered for a tube 50 of fixed outer diameter. The factors used in determining the tube wall thickness include the mean metal temperature, total stress state, and corrosion allowance. Furthermore, the corrosion rate is intimately linked to tube surface temperature, and generally increases exponentially with increased temperature. Accordingly, in a heat exchange reactor for steam reforming employing the flow geometry of U.S. application Ser. No. 09/642,008, the zone of highest temperature (fluid inlet 26 in FIG. 1) thus sets the wall thickness requirement for the entire reactor as the peak temperature is realized in this zone. It is advantageous to ensure that the stress state is minimized by practicing the improved methods of the present invention to reduce or eliminate the occurrence of thermal stresses. It is also desirable to provide a means to combat the effects of corrosion, and to mechanically support the tubing in the zones of highest temperature, as described below.

In light of the considerations above, a more preferred embodiment of the extended heat transfer surfaces 80 of the present invention includes fins 86 which are placed in intimate contact with each other along the length of the tube 50, in order to completely cover the outer surface 51 of tube wall with the metal collar portion 81 of the fins 86. A most preferred embodiment comprises fins 88, which are placed so that the collar portions 81 of the fins 88, which are parallel to the tube axis, overlap. This overlap may be facilitated by providing an increased radius in the elbow connection between the collar portion 81 and the fin portion 82 as shown in FIG. 5, or by providing a conically-tapered collar which is subsequently made to fit snugly to the outer surface 51 of the tube wall and the mating of the fin 88 by the action of mechanical expansion of the tube. Both of the fin configurations 86 and 88 provide a continuous barrier between the high-temperature, corrosive second process fluid and the outer surface 51 of the tube wall. In the most preferred embodiment with fins 88 having overlapping collars, the protective barrier is not degraded by corrosive action. If the embodiment providing fins 86 in contact with each other, corrosive action of the fluid will eventually erode the protective layer and contact the outer surface 51, but only after a considerable period of time. Both of the fin configurations 86 and 88 can provide a significantly-enhanced corrosion resistance compared to the fin configuration 84 in which the fins are not in contact with one another.

Proper selection of the fin material can provide significantly enhanced corrosion resistance and/or significantly higher strength than that of the tubes themselves. This can facilitate a precipitate reduction in the tube wall thickness as compared with related art reactors. The reduction in tube wall thickness has the additional advantage of creating increased interior volume per unit length of tubing when the outer diameter of the tube is a fixed value. For heat exchange reactor steam reformer configurations, an increase in the interior volume of the tubes per unit length facilitates a further significant reduction in the length of tubing required, as well as a decrease in first fluid pressure drop for the fluid flowing through the tubes. The fins 80 are preferably constructed of a first material possessing very high strength and corrosion resistance. The tubes 50 can then be constructed of a second material with lower strength and/or corrosion resistance, which is optimized for the operating environment inside the tubes 50 in contact with the first fluid. Preferably, the second material is also less expensive, more easily fabricated into tubing, and easier to mechanically-expand than the first material.

The thermal gradients along the tube axis in a tubular heat exchange reactor with the flow geometry of U.S. application Ser. No. 09/642,008 creates thermal stresses due to differential expansion between the baffles 60 and extended heat transfer surfaces 70, and the manifold header plates 34 and 44. It can be appreciated from FIG. 1 that depending upon the temperature of the second fluid at ports 25 and 26, particularly severe longitudinal thermal gradients may be established. These gradients may cause significant internal stresses in the walls of the tubes 50, which lead to reduced tube life for a given tube thickness.

Figure 6:
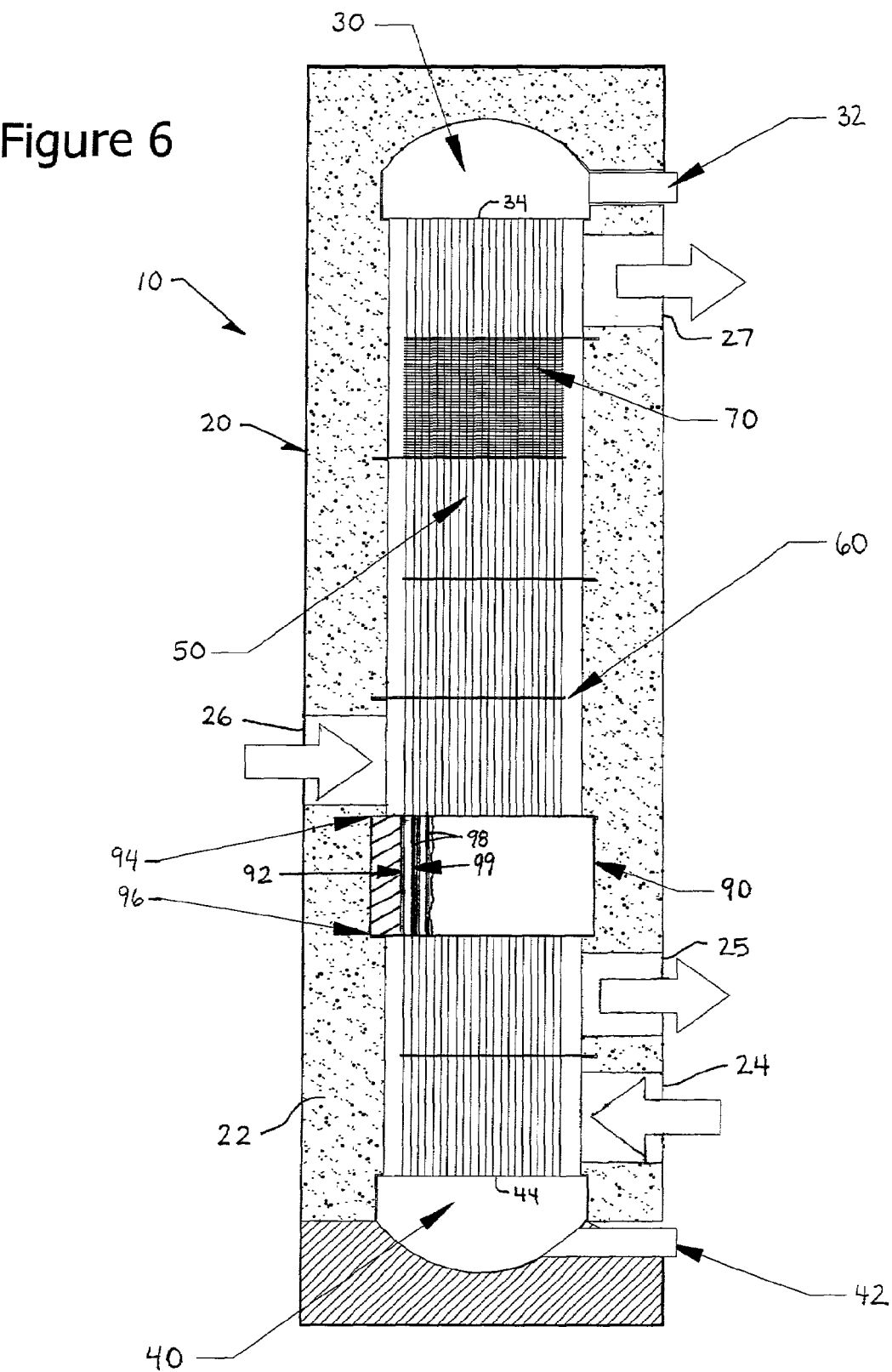
FIG. 6 a schematic view of a heat exchange reactor according to the present invention including a thermal insulation layer.

The present invention provides means to reduce these gradients, which are illustrated in FIG. 6. FIG. 6 shows a tubular heat exchange reactor 10 similar to the reactor shown in FIG. 1. The principal difference is the provision of a thermal insulation zone or thermal insulator 90, which creates a thermal barrier at a large temperature gradient zone between the highest temperature zone near inlet 26 and the lower-temperature zone near outlet 25. By providing a thermal insulator 90 between these two zones, the reduction in thermal conduction between the zones thereby creates a gradual transition in temperature, which reduces the occurrence of internal thermal stresses on the tubes 50.

The thermal insulation zone 90 may be formed as a single unitized body from any suitable insulating material compatible with the operating conditions. The thermal insulation zone 90 can be provides with baffle plates 94 and 96 on either side thereof. The thermal insulator 90 includes holes 92 extending therethrough for receiving the tubes 50, which are depicted in the partial cross-sectional view of the thermal insulator in FIG. 6. However, differential thermal expansion between the unitized insulating mass and the manifold header plates 34 and 44 may require the provision of oversized holes (e.g., as disclosed in FIG. 4 and the corresponding text) for the thermal insulator 90. However, these oversized holes undesirably provide a route for fluid bypass directly from zone 25 to zone 26. More preferably, the thermal insulation zone 90 is formed from a resilient insulating material compatible with the operating conditions within the reactor 10 and having holes with little or no clearance between the holes of the insulator 90 and the outer surfaces 51 of the tubes 50 during both operational and non-operational states. Such a resilient insulating material preferably allows for the expansion of the header plates 34 and 44 without permanent deformation of the thermal insulator 90 or large stress on the tubes 50. Examples of such materials include refractory fiber felts, mats, and blankets. These materials present the additional advantage of being able to be readily die-cut from sheet with very little manufacturing expense. In an alternative embodiment, the thermal insulator 90 can be formed of a plurality of layers of insulating material, for example the required total thickness of the thermal insulation zone can be attained by stacking a plurality of die-cut, compliant layers. Preferably, these compliant layers fit snugly to the tubes 50, thus substantially reducing the bypass of fluid between the zones.

The present invention addresses the mechanical reinforcement of the otherwise unsupported tubes 50 passing through the insulation zone 90. If the tubular reactor 10 is assembled using the preferred technique of mechanical expansion of the tubes, short-sections of tube 98 shaped like a sleeve may be placed inside the thermal insulation zone 90, around each tube 50 in the array 52. Upon mechanical expansion, these sections of tubing 98 are brought into intimate contact with the outer surface 51 of the tube outer wall. By proper selection of the material and thickness of the tube sections 98, the mechanical strength and corrosion resistance of the tubes 50 may be enhanced as described above for the fins 80 of the present invention.

The supplemental tube sections 98 of the present invention preferably have a wall thickness sufficient to transmit load between the baffle plates 94 and 96 located on either face of the thermal insulation zone 90, and the supplemental tube sections 98 preferably have an outer surface 99 with an outer diameter that prevents the tube sections 98 from passing through the holes in the baffle plates 94 and 96. This configuration provides two surprising advantages. First, the inability of the supplemental tube sections 98 to pass through the holes of the baffles 94 and 96 prevents the inadvertent creation of mechanical interference during thermal cycling between the tube 50 with the supplemental tube section 98 and the internal surface of the holes of the baffles 94 and 96, thus nullifying the advantages of the improved baffle holes of the present invention. The second advantage is the ability to transmit mechanical load through the entire assembly of the tubular reactor core during fabrication. This allows the relaxation of flatness tolerances for baffles and extended heat transfer surfaces as these flatness variations may be removed by the application of mechanical load to the entire assembly. This affords significantly improved ease of manufacture relative to the methods of the related art.

The advantages of the present invention may be more clearly understood by reference to the following three detailed examples.

In a first example, a tubular heat exchange reactor is provided with one hundred, 0.50 inch outer diameter tubes oriented with their centers spaced apart by a distance equal to two outer diameters and oriented in a square unit pattern or array. The tubular heat exchange reactor is operated with a manifold header plate temperature of 450° C. and a peak baffle temperature of 950° C. Each hole through the baffle requires a radial clearance of at least 0.010 inches for assembly purposes. The centerline of the four corner tubes are 7.071 inches from the center of the tube array. A symmetrical baffle plate that is centered at the center of the tubular array is considered here. Further, the tube array is assumed to be centered in the header plate as well. The center of the four tubes nearest the center of the tube array are 0.707 inches from the center of the array. If the material of construction has a coefficient of thermal expansion of 0.000018 m/m° C., and the entire reactor is constructed of the same material, the differential expansion between the manifold header plates and the baffle may be calculated using the relationship $\Delta L = \alpha \Delta T L_o$. For the outermost corner tubes, the differential expansion is 0.063 inches. For the innermost tubes, the differential expansion is 0.006 inches. Thus, for this example, if the tubes were nominally centered in the baffle holes upon construction at room temperature, the innermost tubes would exhibit no interference with the baffle holes, while the corner tubes must deal with a mechanical interference (differential expansion minus the radial clearance) of 0.053 inches, which is ten percent of the tube diameter.

In a second example, if the tubular reactor of the first example is provided with baffles fabricated from a lower thermal expansion material according to the first method of the present invention, the differential expansion due to the thermal differences within the reactor would be reduced. If the material used to construct the manifold header plates is an austenitic alloy, then a representative ferritic alloy can be selected for constructing the baffles with a coefficient of thermal expansion of 0.0000135 m/m° C. On heating from 25° C. to 450° C., the position of the center of the corner tube at the manifold header plate, due to the thermal expansion of the header plate, would move 0.054 inches. The center of the corresponding tube hole in the baffle, when heated from 25° C. to 950° C., would move 0.088 inches. Thus, the net difference (differential expansion) between the two centers would be 0.034 inches, which is a significant improvement over the 0.063 inches of the first example. For the tubes nearest the tube array center, the total differential expansion is reduced to 0.003 inches.

In a third example, the mechanical interference due to thermal expansion apparent in the first and second examples can be completely eliminated by applying the configurations depicted in FIG. 4 according to the present invention (i.e. the provision of a circular baffle hole of increased size concentric with the tube axis, the provision of a circular baffle hole of increased size not concentric with the tube, and/or the provision of a non-circular baffle hole). Each of these configurations yields a different hole area, and thus a different leakage path area. The hole dimensions and fractional open area per hole are calculated for the outermost corner tubes for the tubular reactor of the first and second examples, and the results are tabulated in Table 1. Table 1 shows the additive effect of combining the method of baffle material selection and the methods of enlarged baffle through holes as taught in the present invention. In all cases, the 0.010 inches radial clearance is maintained in operation and during assembly at room temperature.

TABLE 1

|  | Example 1 | | Example 2 | |
| --- | --- | --- | --- | --- |
|  | hole area (sq. in.) | Percent open area | hole area (sq. in.) | Percent open area |
| concentric, round | 0.328 | 40% | 0.272 | 28% |
| non-concentric, round | 0.267 | 26% | 0.241 | 19% |
| non-round | 0.256 | 23% | 0.236 | 17% |

These hole areas and open areas are the worst-case values for the outermost tubes. The sizes of the holes may be reduced for tubes located closer to the center of the tube array according to the teachings of the present invention.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A heat exchange reactor comprising:
   a housing;
   a plurality of tubes configured to carry a first fluid, said plurality of tubes being mounted within said housing;
   a baffle having a plurality of holes receiving said plurality of tubes, said baffle being configured to guide a second fluid provided within said housing to flow in a direction generally perpendicular to said plurality of tubes;
   means for minimizing adverse effects of thermal expansion of at least one of said baffle and said plurality of tubes; and
   a first header plate mounting first ends of said plurality of tubes within said housing and a second header plate mounting second ends of said plurality of tubes within said housing,
   wherein said means for minimizing adverse effects of thermal expansion comprises means for reducing a differential thermal expansion between said first header plate, said second header plate, and said baffle, wherein said means for minimizing adverse effects of thermal expansion further comprises means for minimizing mechanical interference between said baffle and said plurality of tubes in both an operational state of said heat exchange reactor and a non-operational state of said heat exchange reactor.

2. The heat exchange reactor according to claim 1, wherein said means for minimizing the adverse effects of thermal expansion further comprises means for providing a thermal insulation zone along a length of said plurality of tubes at a large temperature gradient zone within said heat exchange reactor.

3. The heat exchange reactor according to claim 2, further comprising:
   a heat transfer fin in contact with at least one of said plurality of tubes, said heat transfer fin being configured to contact the second fluid provided within said housing; and
   means for minimizing adverse effects of thermal expansion of said heat transfer fin.

4. A heat exchange reactor comprising:

a housing;

a plurality of tubes configured to carry a first fluid, said plurality of tubes being mounted within said housing;

a baffle having a plurality of holes receiving said plurality of tubes, said baffle being configured to guide a second fluid provided within said housing to flow in a direction generally perpendicular to said plurality of tubes;

means for minimizing adverse effects of thermal expansion of at least one of said baffle and said plurality of tubes; and a first header plate mounting first ends of said plurality of tubes within said housing and a second header plate mounting second ends of said plurality of tubes within said housing, wherein said means for minimizing adverse effects of thermal expansion comprises means for reducing a differential thermal expansion between said first header plate, said second header plate, and said baffle, wherein said means for minimizing the adverse effects of thermal expansion further comprises means for providing a thermal insulation zone along a length of said plurality of tubes at a large temperature gradient zone within said heat exchange reactor.

5. A heat exchange reactor comprising:

a housing;

a plurality of tubes configured to carry a first fluid, said plurality of tubes being mounted within said housing;

a baffle having a plurality of holes receiving said plurality of tubes, said baffle being configured to guide a second fluid provided within said housing to flow in a direction generally perpendicular to said plurality of tubes;

means for minimizing adverse effects of thermal expansion of at least one of said baffle and said plurality of tubes; and a first header plate mounting first ends of said plurality of tubes within said housing and a second header plate mounting second ends of said plurality of tubes within said housing, wherein said means for minimizing adverse effects of thermal expansion comprises means for reducing a differential thermal expansion between said first header plate, said second header plate, and said baffle, further comprising:

a heat transfer fin in contact with at least one of said plurality of tubes, said heat transfer fin being configured to contact the second fluid provided within said housing; and means for minimizing adverse effects of thermal expansion of said heat transfer fin.

6. A heat exchange reactor comprising:

a housing;

a plurality of tubes configured to carry a first fluid, said plurality of tubes mounted within said housing;

a heat transfer fin in contact with at least one of said plurality of tubes, said heat transfer fin being configured to contact a second fluid provided within said housing;

means for minimizing adverse effects of thermal expansion of at least one of said heat transfer fin and said plurality of tubes; and a first header plate mounting first ends of said plurality of tubes within said housing and a second header plate mounting second ends of said plurality of tubes within said housing, wherein said means for minimizing adverse effects of thermal expansion comprises means for reducing a differential thermal expansion between said first header plate, said second header plate, and said heat transfer fin, wherein said means for minimizing the adverse effects of thermal expansion further comprises means for providing a thermal insulation zone along a length of said plurality of tubes at a large temperature gradient zone within said heat exchange reactor.

7. A heat exchange reactor comprising:

a housing;

a plurality of tubes configured to carry a first fluid, said plurality of tubes mounted within said housing;

a baffle having a plurality of holes receiving said plurality of tubes, said baffle being configured to guide a second fluid provided within said housing to flow in a direction generally perpendicular to said plurality of tubes;

a first header plate mounting first ends of said plurality of tubes within said housing and a second header plate mounting second ends of said plurality of tubes within said housing; and a thermal insulator defining a thermal insulation zone along a length of said plurality of tubes at a large temperature gradient zone within said heat exchange reactor, said thermal insulator having a plurality of holes receiving said plurality of tubes, wherein said housing has a first temperature zone and a second temperature zone, said first temperature zone and said second temperature zone being at different temperatures, wherein said first header plate is provided within said first temperature zone and said baffle is provided within said second temperature zone, and wherein said first header plate is made of a material having a first coefficient of thermal expansion and said baffle is made of a material having a second coefficient of thermal expansion, said first coefficient of thermal expansion being different from said second coefficient of thermal expansion.

8. The heat exchange reactor according to claim 7, wherein said second header plate is provided within said first temperature zone.

9. The heat exchange reactor according to claim 7, wherein said second header plate is made of a material having the first coefficient of thermal expansion.

10. The heat exchange reactor according to claim 7, wherein said first temperature zone is at a temperature that is higher than a temperature of said second temperature zone, and wherein said second coefficient of thermal expansion is greater than said first coefficient of thermal expansion.

11. The heat exchange reactor according to claim 7, further comprising a heat transfer fin in contact with at least one of said plurality of tubes, said heat transfer fin being configured to contact the second fluid provided within said housing, wherein said heat transfer fin is provided within said second temperature zone, and wherein said heat transfer fin is made of said material having a second coefficient of thermal expansion.

12. The heat exchange reactor according to claim 7, wherein at least one hole of said plurality of holes is shaped to minimize mechanical interference between a respective tube of said plurality of tubes extending through said at least one hole and said baffle in both an operational state of said heat exchange reactor and a non-operational state of said heat exchange reactor.

13. A heat exchange reactor comprising:
a housing;
a plurality of tubes configured to carry a first fluid, said plurality of tubes mounted within said housing;
a baffle having a plurality of holes receiving said plurality of tubes, said baffle being configured to guide a second fluid provided within said housing to flow in a direction generally perpendicular to said plurality of tubes; and
a first header plate mounting first ends of said plurality of tubes within said housing and a second header plate mounting second ends of said plurality of tubes within said housing,
wherein said housing has a first temperature zone and a second temperature zone, said first temperature zone and said second temperature zone being at different temperatures, wherein said first header plate is provided within said first temperature zone and said baffle is provided within said second temperature zone, and
wherein said first header plate is made of a material having a first coefficient of thermal expansion and said baffle is made of a material having a second coefficient of thermal expansion, said first coefficient of thermal expansion being different from said second coefficient of thermal expansion,
wherein said first temperature zone is at a temperature that is lower than a temperature of said second temperature zone, and wherein said second coefficient of thermal expansion is less than said first coefficient of thermal expansion.

14. A heat transfer reactor comprising:
a housing;
a plurality of tubes configured to carry a first fluid, said plurality of tubes mounted within said housing;
a baffle having a plurality of holes receiving said plurality of tubes, said baffle being configured to guide a second fluid provided within said housing to flow in a direction generally perpendicular to said plurality of tubes; and
a first header plate mounting first ends of said plurality of tubes within said housing and a second header plate mounting second ends of said plurality of tubes within said housing,
wherein said housing has a first temperature zone and a second temperature zone, said first temperature zone and said second temperature zone being at different temperatures, wherein said first header plate is provided within said first temperature zone and said baffle is provided within said second temperature zone, and
wherein said first header plate is made of a material having a first coefficient of thermal expansion and said baffle is made of a material having a second coefficient of thermal expansion, said first coefficient of thermal expansion being different from said second coefficient of thermal expansion,
further comprising a heat transfer fin in contact with one tube of said plurality of tubes, said heat transfer fin not being attached to another tube of said plurality of tubes, said heat transfer fin being configured to contact the second fluid provided within said housing.

15. A heat exchange reactor comprising:
a housing;
a plurality of tubes configured to carry a first fluid, said plurality of tubes mounted within said housing;
a heat transfer fin in contact with at least one of said plurality of tubes, said heat transfer fin being configured to contact a second fluid provided within said housing;
a first header plate mounting first ends of said plurality of tubes within said housing and a second header plate mounting second ends of said plurality of tubes within said housing; and
a thermal insulator defining a thermal insulation zone along a length of said plurality of tubes at a large temperature gradient zone within said heat exchange reactor, said thermal insulator having a plurality of holes receiving said plurality of tubes,
wherein said housing has a first temperature zone and a second temperature zone, said first temperature zone and said second temperature zone being at different temperatures, wherein said first header plate is provided within said first temperature zone and said heat transfer fin is provided within said second temperature zone, and
wherein said first header plate is made of a material having a first coefficient of thermal expansion and said heat transfer fin is made of a material having a second coefficient of thermal expansion, said first coefficient of thermal expansion being different from said second coefficient of thermal expansion.

16. The heat exchange reactor according to claim 15, wherein said second header plate is provided within said second temperature zone.

17. The heat exchange reactor according to claim 15, wherein said second header plate is made of a material having the first coefficient of thermal expansion.

18. The heat exchange reactor according to claim 15, wherein said first temperature zone is at a temperature that is higher than a temperature of said second temperature zone, and wherein said second coefficient of thermal expansion is greater than said first coefficient of thermal expansion.

19. The heat exchange reactor according to claim 15, further comprising a baffle having a plurality of holes receiving said plurality of tubes, said baffle being configured to guide the second fluid provided within said housing to flow in a direction generally perpendicular to said plurality of tubes, wherein at least one hole of said plurality of holes is shaped to minimize mechanical interference between a respective tube of said plurality of tubes extending through said at least one hole to minimize mechanical interference between said baffle and said respective tube in both an operational state of said heat exchange reactor and a non-operational state of said heat exchange reactor.

20. A heat exchange reactor comprising:
a housing;
a plurality of tubes configured to carry a first fluid, said plurality of tubes mounted within said housing;
a heat transfer fin in contact with at least one of said plurality of tubes, said heat transfer fin being configured to contact a second fluid provided within said housing; and
a first header plate mounting first ends of said plurality of tubes within said housing and a second header plate mounting second ends of said plurality of tubes within said housing,
wherein said housing has a first temperature zone and a second temperature zone, said first temperature zone and said second temperature zone being at different temperatures, wherein said first header plate is provided within said first temperature zone and said heat transfer fin is provided within said second temperature zone,
wherein said first header plate is made of a material having a first coefficient of thermal expansion and said heat transfer fin is made of a material having a second coefficient of thermal expansion, said first coefficient of thermal expansion being different from said second coefficient of thermal expansion,
wherein said first temperature zone is at a temperature that is lower than a temperature of said second temperature zone, and
wherein said second coefficient of thermal expansion is less than said first coefficient of thermal expansion.

21. A heat transfer reactor comprising:
a housing;
a plurality of tubes configured to carry a first fluid, said plurality of tubes mounted within said housing;
a heat transfer fin in contact with at least one of said plurality of tubes, said heat transfer fin being configured to contact a second fluid provided within said housing; and
a first header plate mounting first ends of said plurality of tubes within said housing and a second header plate mounting second ends of said plurality of tubes within said housing,
wherein said housing has a first temperature zone and a second temperature zone, said first temperature zone and said second temperature zone being at different temperatures, wherein said first header plate is provided within said first temperature zone and said heat transfer fin is provided within said second temperature zone,
wherein said first header plate is made of a material having a first coefficient of thermal expansion and said heat transfer fin is made of a material having a second coefficient of thermal expansion, said first coefficient of thermal expansion being different from said second coefficient of thermal expansion, and
wherein said heat transfer fin is not attached to another tube of said plurality of tubes.

22. A heat exchange reactor comprising:
a housing;
a plurality of tubes configured to carry a first fluid through said housing in a single-pass arrangement, said plurality of tubes mounted within said housing; and
a baffle having a plurality of holes receiving said plurality of tubes, said baffle being configured to guide a second fluid provided within said housing to flow in a direction generally perpendicular to said plurality of tubes, said plurality of holes is configured in an array, said array having a center,
wherein said plurality of holes have predetermined outlines that differ in at least one of size and shape depending upon a distance of a respective hole from said center of said array to minimize mechanical interference between said baffle and a respective tube in both an operational state of said heat exchange reactor and a non-operational state of said heat exchange reactor.

23. The heat exchange reactor according to claim 22, further comprising a first header plate rigidly mounting first ends of said plurality of tubes within said housing and a second header plate rigidly mounting second ends of said plurality of tubes within said housing.

24. The heat exchange reactor according to claim 22, further comprising a first header plate rigidly mounting first ends of said plurality of tubes within said housing and a second header plate rigidly mounting second ends of said plurality of tubes within said housing, wherein said predetermined outlines are further dependent upon a differential thermal expansion between said first header plate, said second header plate, and said baffle.

25. The heat exchange reactor according to claim 22, further comprising a first header plate rigidly mounting first ends of said plurality of tubes within said housing and a second header plate rigidly mounting second ends of said plurality of tubes within said housing, wherein said predetermined outlines are further dependent upon a distance of said respective hole from a center of relative expansion between said first header plate, said second header plate, and said baffle.

26. The heat exchange reactor according to claim 22, wherein at least one hole of said plurality of holes is offset from a center of an array of said plurality of tubes, and wherein said at least one hole and said respective tube are concentrically aligned when said heat exchange reactor is at a non-operational, ambient temperature.

27. The heat exchange reactor according to claim 22, wherein at least one hole of said plurality of holes is offset from a center of an array of said plurality of tubes, and wherein said at least one hole and said respective tube are non-concentrically aligned when said heat exchange reactor is at a non-operational, ambient temperature.

28. The heat exchange reactor according to claim 27, wherein a center of said at least one hole is farther from said center of said array than a center of said respective tube when said heat exchange reactor is at a non-operational, ambient temperature.

29. The heat exchange reactor according to claim 28, wherein said center of said at least one hole is closer to said center of said array than said center of said respective tube when said heat exchange reactor is at an operational temperature.

30. The heat exchange reactor according to claim 22, wherein at least one hole of said plurality of holes is circular.

31. The heat exchange reactor according to claim 22, wherein a portion of said respective tube extending through a hole has an outer surface with a circular cross-section.

32. The heat exchange reactor according to claim 22, wherein at least one hole of said plurality of holes is non-circular.

33. The heat exchange reactor according to claim 22, wherein at least one hole of said plurality of holes is elongated in a direction extending along a radial line of said center of said array.

34. The heat exchange reactor according to claim 22, further comprising a first header plate rigidly mounting first ends of said plurality of tubes within said housing and a second header plate rigidly mounting second ends of said plurality of tubes within said housing, wherein at least one hole of said plurality of holes is elongated in a direction extending along a radial line of a center of relative expansion between said first header plate, said second header plate, and said baffle.

35. A heat exchange reactor comprising:
a housing;
a plurality of tubes configured to carry a first fluid, said plurality of tubes mounted within said housing, said plurality of holes are configured in an array, said array having a center; and
a baffle having a plurality of holes receiving said plurality of tubes, said baffle being configured to guide a second fluid provided within said housing to flow in a direction generally perpendicular to said plurality of tubes,
wherein said plurality of holes have predetermined outlines that differ in at least one of size and shape depending upon a distance of a respective hole from said center of said array to minimize mechanical interference between said baffle and a respective tube in both an operational state of said heat exchange reactor and a non-operational state of said heat exchange reactor, wherein a first hole of said baffle is provided closer to said center of said array than a second hole of said baffle, and wherein said first hole has a predetermined size that is smaller than a predetermined size of said second hole.

36. A heat exchange reactor comprising:
a housing;
a plurality of tubes configured to carry a first fluid, said plurality of tubes mounted within said housing;
a first header plate mounting first ends of said plurality of tubes within said housing and a second header plate mounting second ends of said plurality of tubes within said housing; and
a thermal insulator defining a thermal insulation zone along a length of said plurality of tubes at a large temperature gradient zone within said heat exchange reactor, said thermal insulator having a plurality of holes receiving said plurality of tubes,
wherein said first header plate is made of a material having a first coefficient of thermal expansion and said baffle is made of a material having a second coefficient of thermal expansion, said first coefficient of thermal expansion being different from said second coefficient of thermal expansion.

37. The heat exchange reactor according to claim 36, wherein said thermal insulator is formed of a single unitary body of insulation material.

38. The heat exchange reactor according to claim 36, wherein said thermal insulator is formed of a resilient material.

39. The heat exchange reactor according to claim 36, wherein said thermal insulator is formed of a plurality of stacked layers.

40. The heat exchange reactor according to claim 36, further comprising a supplemental tube section provided about an outer surface of one of said plurality of tubes, said supplemental tube section being provided within said thermal insulation zone.

41. The heat exchange reactor according to claim 40, wherein said thermal insulator has a first baffle provided on a first end thereof and a second baffle provided on a second end thereof, said first baffle and said second baffle each having a plurality of holes receiving said plurality of tubes, said supplemental tube section being provided between said first baffle and said second baffle.

42. The heat exchange reactor according to claim 41, wherein said supplemental tube section has a diameter larger than holes on said first baffle and said second baffle.

43. A method of minimizing adverse effects of thermal expansion within a heat exchange reactor, the heat exchange reactor including a housing, a plurality of tubes mounted within the housing and configured to carry a first fluid, a baffle having a plurality of holes receiving the plurality of tubes, the baffle being configured to guide a second fluid provided within the housing to flow in a direction generally perpendicular to the plurality of tubes, and a first header plate mounting first ends of the plurality of tubes within the housing and a second header plate mounting second ends of the plurality of tubes within the housing, wherein the housing has a first temperature zone and a second temperature zone, said method comprising the step of:
reducing a differential thermal expansion between the first header plate, the second header plate, and the baffle by selecting material for the first header plate, the second header plate, and baffle having predetermined coefficients of thermal expansion based upon location of the material within the first temperature zone or the second temperature zone,
wherein the first header plate is provided within the first temperature zone and the baffle is provided within the second temperature zone,
wherein the first header plate is made of a material having a first coefficient of thermal expansion and the baffle is made of a material having a second coefficient of thermal expansion,
wherein the first temperature zone is at a temperature that is lower than a temperature of the second temperature zone, and
wherein the second coefficient of thermal expansion is less than the first coefficient of thermal expansion.

44. The method according to claim 43, wherein the second header plate is provided within the first temperature zone.

45. A method of minimizing adverse effects of thermal expansion within a heat exchange reactor, the heat exchange reactor including a housing, a plurality of tubes mounted within the housing and configured to carry a first fluid, a heat transfer fin in contact with at least one of the plurality of tubes, the heat transfer fin being configured to contact a second fluid provided within the housing, and a first header plate mounting first ends of the plurality of tubes within the housing and a second header plate mounting second ends of the plurality of tubes within the housing, wherein the housing has a first temperature zone and a second temperature zone, said method comprising the step of:
reducing a differential thermal expansion between the first header plate, the second header plate, and the heat transfer fin by selecting material for the first header plate, the second header plate, and heat transfer fin having predetermined coefficients of thermal expansion based upon location of the material within the first temperature zone or the second temperature zone,
wherein the first header plate is provided within the first temperature zone and the heat transfer fin is provided within the second temperature zone,
wherein the first header plate is made of a material having a first coefficient of thermal expansion and the heat transfer fin is made of a material having a second coefficient of thermal expansion,
wherein the first temperature zone is at a temperature that is lower than a temperature of the second temperature zone, and
wherein the second coefficient of thermal expansion is less than the first coefficient of thermal expansion.

46. The method according to claim 45, wherein the second header plate is provided within the first temperature zone.

47. A method of minimizing adverse effects of thermal expansion within a heat exchange reactor, the heat exchange reactor including a housing, a plurality of tubes mounted within the housing and configured to carry a first fluid through the housing in a single-pass arrangement, and a baffle having a plurality of holes receiving the plurality of tubes, the baffle being configured to guide a second fluid provided within the housing to flow in a direction generally perpendicular to the plurality of tubes, the plurality of holes being configured in an array, the array having a center, said method comprising the step of:
providing the plurality of holes with predetermined outlines that differ in at least one of size and shape depending upon a distance of a respective hole from said center of said array to minimize mechanical interference between the baffle and a respective tube in both an operational state of the heat exchange reactor and a non-operational state of the heat exchange reactor.

48. A method of minimizing adverse effects of thermal expansion within a heat exchange reactor, the heat exchange reactor including a housing, a plurality of tubes mounted within the housing and configured to carry a first fluid, a heat transfer fin in contact with at least one of the plurality of tubes, a first header plate mounting first ends of the plurality of tubes within the housing, and a second header plate mounting second ends of the plurality of tubes within the housing, the heat transfer fin being configured to contact a second fluid provided within the housing, said method comprising the step of:

thermally connecting the heat transfer fin to one tube of the plurality of tubes wherein the heat transfer fin is not attached to another tube of the plurality of tubes, wherein the housing has a first temperature zone and a second temperature zone, the first temperature zone and the second temperature zone being at different temperatures, wherein the first header plate is provided within the first temperature zone and the heat transfer fin is provided within the second temperature zone, and wherein the first header plate is made of a material having a first coefficient of thermal expansion and the heat transfer fin is made of a material having a second coefficient of thermal expansion, the first coefficient of thermal expansion being different from the second coefficient of thermal expansion.

49. A method of minimizing adverse effects of thermal expansion within a heat exchange reactor, the heat exchange reactor including a housing, a plurality of tubes mounted within the housing and configured to carry a first fluid, a first header plate mounting first ends of the plurality of tubes within the housing, and a second header plate mounting second ends of the plurality of tubes within the housing, the housing being configured to carry a second fluid, said method comprising the step of:

providing a thermal insulator defining a thermal insulation zone along a length of the plurality of tubes at a large temperature gradient zone within the heat exchange reactor, the thermal insulator having a plurality of holes receiving the plurality of tubes, wherein the first header plate is made of a material having a first coefficient of thermal expansion and the baffle is made of a material having a second coefficient of thermal expansion, the first coefficient of thermal expansion being different from the second coefficient of thermal expansion.

* * * * *